(No Model.)
G. W. WALTERHOUSE, Sr.
Lamp Stove.
No. 234,153. Patented Nov. 9, 1880.
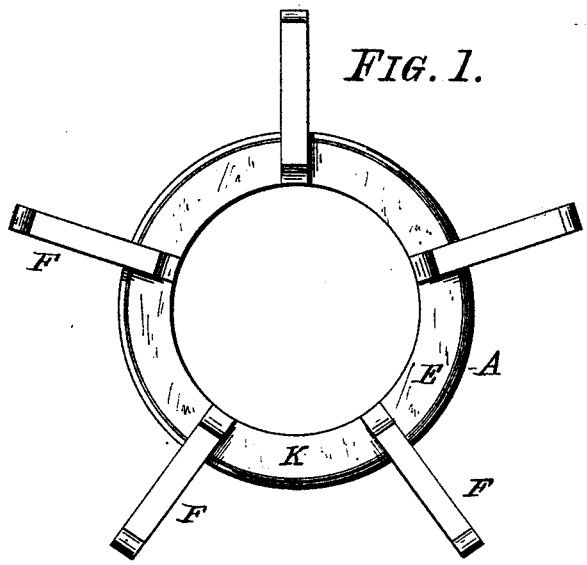
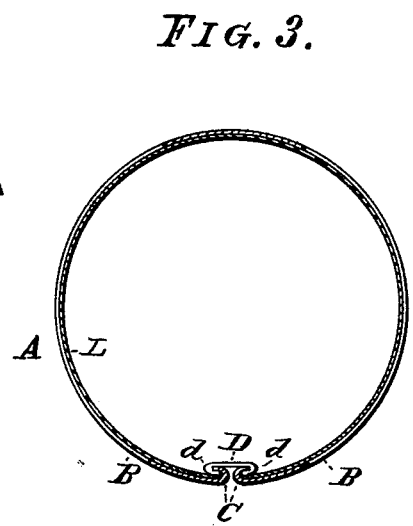
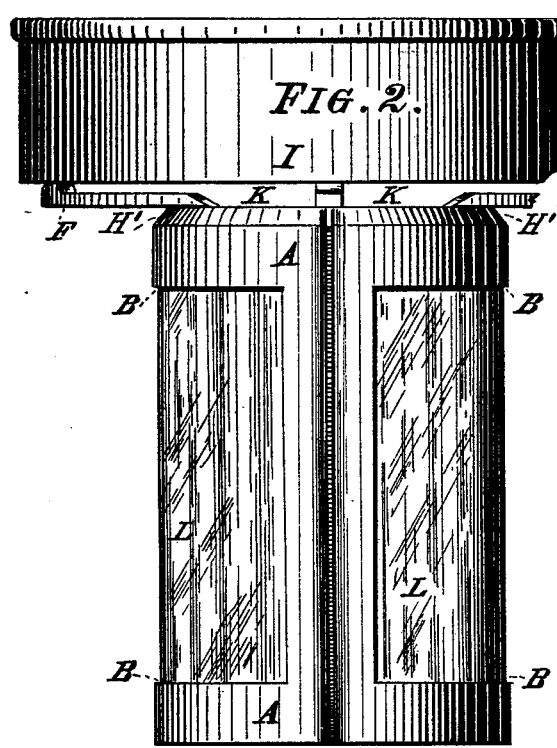
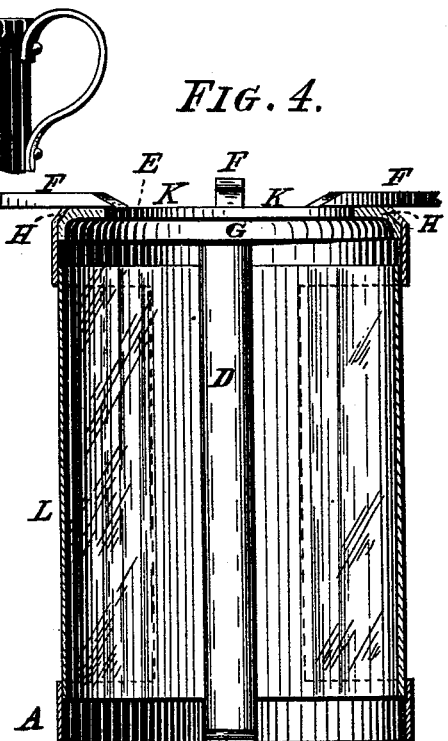
Witnesses:
George P. Straub.
Frank Hirsch.
Inventor:
George W. Walterhouse Sen.
by Michael J. Stark,
Attorney.

UNITED STATES PATENT OFFICE.

GEORGE W. WALTERHOUSE, SEN., OF BUFFALO, NEW YORK.

LAMP-STOVE.

SPECIFICATION forming part of Letters Patent No. 234,153, dated November 9, 1880.

Application filed August 20, 1880. (No model.)

*To all whom it may concern:*

Be it known that I, GEORGE W. WALTERHOUSE, Sen., of Buffalo, in the county of Erie and State of New York, have invented certain new and useful Improvements on a Lamp-Stove; and I do hereby declare that the following description of my said invention, taken in connection with the accompanying sheet of drawings, forms a full, clear, and exact specification, which will enable others skilled in the art to which it appertains to make and use the same.

This invention has general reference to lamp-stoves—that is to say, a device to be used on common lamps for heating and cooking purposes; and it consists, essentially, in such novel combination of parts and details of construction, as hereinafter first fully set forth and described, and then pointed out in the claim.

In the drawings already referred to, which serve to illustrate my invention more fully, Figure 1 is a plan of my improved lamp-stove. Fig. 2 is an elevation of the same. Fig. 3 is a sectional plan, and Fig. 4 a sectional elevation.

Like parts are designated by corresponding letters of reference in all the figures.

In these drawings, the letter A indicates a cylindrical shell of any kind of sheet metal, such as tin, brass, German silver, sheet-iron, Russia iron, &c., having two large openings, B, for the object hereinafter mentioned. This cylinder is not closed with a seam, as sheet-metal shells are usually made, but is left open on the meeting longitudinal edges, said edges being inwardly folded at C, Fig. 3, and there secured together by a locking-strip, D, having its two longitudinal edges folded to embrace the two folded edges of the shell A, as clearly shown in said Fig. 3. Into the inside of this shell A, and in close contact therewith, is placed a sheet of mica, L, formed into the shape of a cylinder in such manner that its longitudinal edges will pass into the folds C of said cylinder, so that the sheet of mica, as well as the cylinder A, will be locked by pushing the strip D over the folded edges of said cylinder. In this manner I accomplish the results that I can at any time remove the mica sheet from the cylinder A to insert a new one or remove the shell A from a top plate, E, having five (more or less) projecting arms, F. This top plate is formed of an annular ring having a downwardly-projecting rim or flange, G, Fig. 4, and its upper external edge beveled at H, and of the arms F, already mentioned, said arms being raised above the top surface of the ring E in such manner that a vessel, I, placed upon said arms, does not rest upon the ring E, and that there remains a space, K, between the plate E and the bottom of the vessel I for the escape of the gases of combustion.

The top plate, E, is held to the shell A by bending the upper edge of said cylinder onto the beveled part H of said plate; but it may be readily removed therefrom by withdrawing the locking-strip D and allowing the shell A to spring open sufficiently to pass its contracted part H' over the rim G of the ring E.

In operation, the device hereinbefore described is placed upon any lamp by removing therefrom the usual glass chimney. By thus placing the same in position the heat of the flame is utilized for cooking purposes without interfering to any extent with its light-radiating qualities, because the large mica-covered openings in the shell A allow of the emission of sufficient light to enable the persons using this apparatus to perform their usual duties. In rising the hot gases of combustion strike the bottom of the vessel I and escape through the spaces K, so that perfect ventilation is attained and smoking prevented.

It will be readily observed that the height of the flame may be easily ascertained through the mica sheets L and regulated in the usual manner.

Having thus fully described my invention, I claim as new, and desire to secure to me by Letters Patent of the United States, the following:

As an improved article of manufacture, the lamp-stove hereinbefore described, consisting of a cylindrical shell, A, having openings B, and its longitudinal edges inwardly folded at C, the mica sheet L, placed into the inner side of said shell with its longitudinal edges engaging the folds C, the strip D, with its folds

*d* engaging the folds C and adapted to press the longitudinal ends of said mica sheet against the shell A, and the disk E, having arms F, said disk being held to the shell, substantially as described, and the whole constructed for operation, as and for the object stated.

In testimony that I claim the foregoing as my invention I have hereunto set my hand in the presence of two subscribing witnesses.

GEO. W. WALTERHOUSE, Sen.

Attest:
  MICHAEL J. STARK,
  GEORGE J. STRAUB.